(12) United States Patent
Kuik

(10) Patent No.: US 7,706,316 B1
(45) Date of Patent: Apr. 27, 2010

(54) PROCESSING AN INCOMING PACKET OF UNKNOWN PROTOCOL BY ENCAPSULATING THE PACKET AND SENDING IT TO ANOTHER PROCESSOR

(75) Inventor: Timothy J. Kuik, Lino Lakes, MN (US)

(73) Assignee: Cisco Technology, Inc., San Jose, CA (US)

( * ) Notice: Subject to any disclaimer, the term of this patent is extended or adjusted under 35 U.S.C. 154(b) by 1362 days.

(21) Appl. No.: 10/403,235

(22) Filed: Mar. 26, 2003

(51) Int. Cl.
*H04B 7/216* (2006.01)
*H04L 12/28* (2006.01)

(52) U.S. Cl. .................... 370/320; 370/389
(58) Field of Classification Search .............. 370/389, 370/401, 476, 466, 354, 355, 356, 392
See application file for complete search history.

(56) References Cited

U.S. PATENT DOCUMENTS

| 5,850,388 | A * | 12/1998 | Anderson et al. ........... 370/252 |
| 6,691,147 | B1 * | 2/2004 | Arunkumar et al. ......... 709/200 |
| 6,963,931 | B2 * | 11/2005 | Bunn et al. ................. 709/246 |
| 2001/0009547 | A1 * | 7/2001 | Jinzaki et al. ............... 370/390 |
| 2002/0073215 | A1 * | 6/2002 | Huitema et al. ............. 709/230 |
| 2003/0067912 | A1 * | 4/2003 | Mead et al. ................. 370/389 |
| 2003/0084219 | A1 * | 5/2003 | Yao et al. .................... 710/300 |
| 2003/0193945 | A1 * | 10/2003 | Lewin et al. ................ 370/389 |
| 2004/0001473 | A1 * | 1/2004 | Liu et al. .................... 370/349 |
| 2004/0013129 | A1 * | 1/2004 | Fang .......................... 370/466 |
| 2004/0076155 | A1 * | 4/2004 | Yajnik et al. ................ 370/389 |
| 2004/0109456 | A1 * | 6/2004 | Mahamuni et al. .......... 370/400 |

* cited by examiner

*Primary Examiner*—George Eng
*Assistant Examiner*—Michael Faragalla
(74) *Attorney, Agent, or Firm*—Schwegman, Lundberg & Woessner, P.A.

(57) ABSTRACT

One or more network routers include data path processors and a control path processor. A number of network protocols that are not installed on the data path processors are installed on the control path processor. When one of the data path processors receives a network packet that is in an unrecognized format, a header is appended to the network packet and forwarded to the control path processor. The control path processor removes the header and identifies a proper protocol associated with the network packet. Next, the control path processor places the network packet in a processing stack associated with an appropriately installed network protocol in order to process the network packet on behalf of the originally sending data path processor.

17 Claims, 4 Drawing Sheets

PROCESSING AN INCOMING PACKET OF UNKNOWN PROTOCOL BY ENCAPSULATING THE PACKET AND SENDING IT TO ANOTHER PROCESSOR

TECHNICAL FIELD

The present invention concerns network management. More specifically, the present invention relates to centralizing, distributing, and thereby encapsulating network protocols across multiple network routers, switches, and/or gateways in a multiprocessor networked environment.

BACKGROUND

Efficiently interconnecting storage networks has become a major problem for organizations as these organizations attempt to leverage legacy storage devices and, at the same time, attempt to accommodate new network protocols emerging in the industry.

Typically, a storage environment will include a number of client computing devices interfaced to one or more network routers. The network routers will include external interfaces (interfaces associated with network traffic coming into an organizations internal networks and network traffic exiting the internal networks). The network routers also include internal network interfaces (Network Interface Cards (NIC) and the associated software) designed to translate and route external network traffic within the internal networks of the organizations. These network routers can also be viewed as gateways, bridges, hubs, firewalls, and/or switches that efficiently translate, route and/or forward network traffic through internal networks and out to external networks.

Generally, the network interfaces and protocols associated with internal networks are configured to have higher bandwidth transmissions and throughput than what might typically be available with external network interfaces connections that interface with the internal network. Generally, internal network interfaces and protocols are associated with Ethernet, Gigabit Ethernet (GigE), and/or Fibre-Channel (FC). External network interfaces may include Ethernet, GigE, FC, Asynchronous Transfer Mode (ATM), Frame Relay (FR), and/or Time Division Multiplexing (TDM).

Often the routers are interfaced within an organization's networks to other routers, gateways, switches, hubs, bridges, and the like. These additional routers may be dedicated to handling traffic associated with storage access, management, control, and monitoring. In a similar manner these routers have installed network interfaces along with available network protocols that are available for efficiently moving network traffic associated with storage internal and external to the organization's storage networks.

To optimize an organization's storage networks a storage-area network (SAN) can be configured. A SAN is a high-speed sub-network of shared data-storage devices, such as disk, tape, optical, and other drives. These networks are particularly advantageous not only because they spare other servers in a larger network, such as corporate intranet, from the burden of storing and managing large amounts of data, and thus allow use of these servers for other higher priority uses, but also because they facilitate data consolidation. Consolidation promotes manageability and scalability, by for example, simplifying backup, split, and/or restore procedures and by facilitating expansion of storage capacity.

Some SANs are structured so that an end user or client computer can access data on one or more target storage devices through a storage router FC interface switch. The FC interface converts data received from the storage router to a FC-compliant protocol, such as FC Arbitrated Loop (FC-AL) standard, and directs the converted data via high-speed electrical or optical fibre lines to the proper target devices.

Generally, a storage router includes software that uses an implementation of the Small Computer System Interface (SCSI) or Internet SCSI (iSCSI) protocol to route data packets across Transmission Control Protocol (TCP)/Internet Protocol (IP) (TCP/IP) enabled networks. iSCSI is a popular family of protocols for communicating between one or more client computers, i.e., one or more servers and one or more I/O devices, especially one or more storage devices.

Current SCSI/iSCSI operation on storage routers uses single processor architectures with an integrated FC switch, which runs the storage router software for SCSI/iSCSI operation, a GigE interface, which provides connection to an IP network for access by servers/clients, and the FC interface, which provides connection to a storage network for access to a storage device. In addition, current storage routers include High Availability (HA) and management interfaces, which provide a physical connection for high availability communication with another storage router and for managing the storage routers. These storage routers generally perform many functions, such as communicating with another storage router, management of user configuration, initialization tasks, handling error flags and crash files, processing of storage network packets and the like. Using a single processor to manage all these storage router functions generally lowers the data communication capabilities of storage routers.

Moreover because a single processor is used, each of the storage routers comprising an organization's SAN needs to have each of the available network protocols that can handle the available data formats associated with a variety of network protocols being used. As a result, any Virtual Local Area Network (VLAN) Trunking Protocol (VTP), Simple Network Management Protocol (SNMP), or other protocols associated with network interfaces must be installed on each of the storage routers participating in the SAN. This means that when new protocols become available in the industry, each of these storage routers will need to be upgraded to include any new protocol desired within the SAN. As one of ordinary skill in the art appreciates, this is a time consuming, expensive, and resource intensive process, which is not desired or preferred by an organization.

Accordingly, there is a need for improved routing techniques that permit a centralized processor to have access to a set of desired network protocols, where the centralized processor can process network packets associated with its network protocols on behalf of other processors participating in a network. Thus, a desired number of network protocols do not need to be directly installed on each of the processors in order for the entire network to use these network protocols.

SUMMARY

To address this and other needs, routers deployed in a network include a plurality of data path processors designed to handle a subset of network protocols within the network. A desired number of additional network protocols used within the network are centralized on a control path processor. When a data path processor encounters a network packet that is in a format that it does not recognize, the network packet is encapsulated with a header associated with a protocol used to communicate with the control path processor, and the encapsulated packet is forwarded to the control path processor.

The control path processor identifies the header as coming from the sending data path processor and as indicating that the data path processor lacks an installed network protocol that is necessary to process the network packet. The control path processor then identifies a header associated with the network packet as being associated with a network protocol that is accessible to the control path processor. Accordingly, the network packet is placed in the processing stack for the appropriate network protocol processor where it will be processed by the appropriate network protocol on the control path processor and on behalf of the original sending data path processor.

DETAILED DESCRIPTION OF EXEMPLARY EMBODIMENTS

This description, which references and incorporates the above-identified figures, describes one or more specific embodiments of one or more inventions. These embodiments, offered not to limit but only to exemplify and teach the one or more inventions, are shown and described in sufficient detail to enable those of ordinary skill in the art to implement or practice the invention. Thus, where appropriate to avoid obscuring the invention, the description may omit certain information known to those of skill in the art.

As used herein a network interface includes hardware (e.g., line interfaces, processors, and the like) and/or software (e.g. low-level inter-device protocols, conversion utilities, and the like) associated with network packet data formats and transmissions. Thus, a network interface can be viewed as Ethernet-enabled devices, FC-enabled devices, and others. Moreover, an encapsulated network interface is one that permits higher level protocols to be accessible to a network interface, processor, or other device although not physically installed on that processor, router or other device. Therefore, an encapsulated network interface can be viewed as being virtually available or logically available to a processor, router, or other device. Some higher level protocols include SNMP, VTP, and others.

Furthermore, data path processors (DPP) are processors residing in one or more network routers, bridges, hubs, firewalls, switches, and/or gateways that lack one or more installed network protocols for processing a number of network packets received by the DPPs. However, a DPP's lacking network protocols are virtually or logically available to the DPP via communication with a Control Path Processor (CPP). The CPP includes installed versions of the lacking network protocols of the DPPs and processes a number of network packets on behalf of the DPPs.

Figure 1:
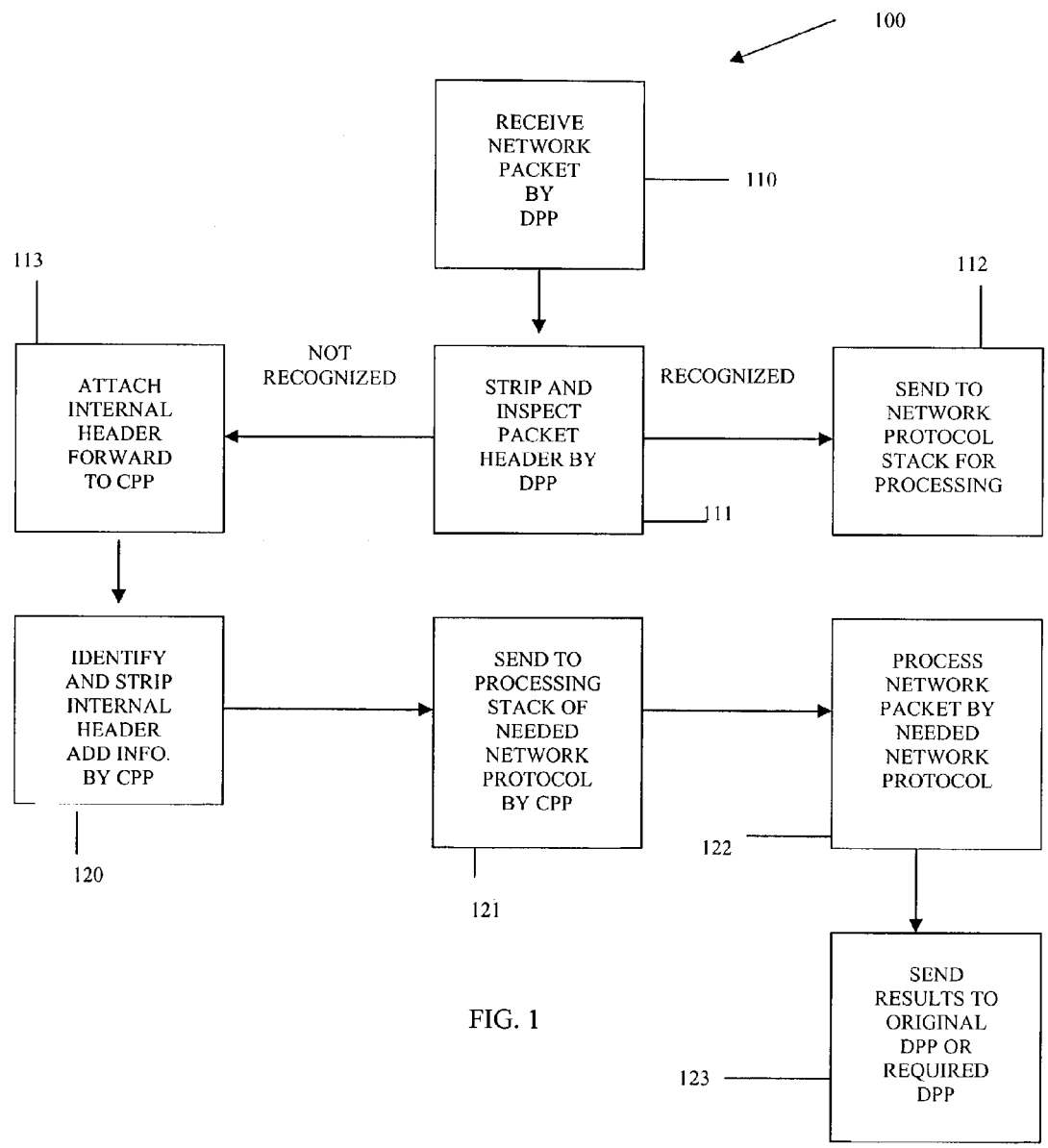
FIG. 1 is a flow diagram of a method for encapsulating a network interface for a networked environment, according to one embodiment of the present invention.

FIG. 1 illustrates a flowchart for one method 100 that encapsulates a network interface within a networked environment. The processing depicted in FIG. 1 can be implemented in firmware, hardware, and/or software within one or more network routers, switches, hubs, firewalls, bridges, gateways, and the like. As used herein a network router includes devices such as routers, hubs, firewalls, bridges, gateways and other devices used to process network packets within a networked environment, such as a SAN, or any other network. Method 100 can be embodied in a single network router having multiple processors or in a combination of network routers in communication with one another, where each network router can include a single processor or multiple processors.

A DPP resides on a network router and is used to process, route, and translate network packets that it receives from other processing devices, client devices, and/or server devices with the network's environment. The DPP also includes external network interfaces to receive and transmit network packets into or out of a local network environment as dictated by the network packets. Thus, the DPP can include Wide Area Network (WAN) and/or Local Area Network (LAN) connectivity. Moreover, the WAN and/or LAN can be hardwired or wireless. Additionally, more than one DPP can exist within a single router or within other routers that are participating in the network's environment.

The DPP includes a number of network interfaces that permit the DPP to receive network packets from different media transmissions having different data formats requiring different protocols. For example, the DPP can include a GigE interface using TCP/IP for processing GigE formatted network packets. Of course as one of ordinary skill in the art appreciates a variety of other interfaces can also be installed with the DPP, such as FR, ATM, FC, TDM, and others.

A number of existing and available higher-level network protocols that are used in the network's environment do not exist on the DPP or are not directly accessible to the DPP. However, under these circumstances, the DPP is capable of still processing network packets associated with these lacking network protocols by using various techniques of embodiments for the present invention.

Accordingly, when a DPP receives a network packet at 110 from another processor, router, client, and/or server, the DPP at 111 strips the packet header. The data format of the network packet will be in a format required by a specific network protocol. This specific network protocol will include the necessary to translate, forward, and/or route the network packet to its next location, which may be internal to the network's environment or external to the network's environment.

If, at 111, the DPP does recognize the packet header of the received network packet, then, at 112, the DPP sends the network packet to a network interface's protocol processing stack that has the proper software for translating the network packet. A processing stack for a protocol includes the necessary hardware and firmware/software to schedule and prioritize the network packet for processing by the network protocol software that is installed or directly accessible to the DPP.

If, at 111, the DPP does not recognize the packet header of the received network packet, then at 113, the DPP will encapsulate the network packet into a format (e.g., low-level protocol format, GigE, FC, and the like) that can be processed by the DPP by appending or attaching an internal header to the network packet. Once this internal header is attached, the network packet is forwarded to a CPP.

The CPP is a different processor having different installed protocols and/or software processing thereon then what is available to the DPP. In some embodiments, the CPP is located in a different network router. In other embodiments, the CPP and DPP reside as different slots within the same network router. The connectivity between the DPP and the CPP can be a local or internal (fast and efficient) connection running Ethernet.

The CPP at 120 strips the internal packet header that was attached by the DPP and inspects it. From the internal packet header, the CPP knows from which DPP the network packet is originating and that the DPP was unable to process the network packet because it lacked the appropriate network protocol required for processing.

Next, the CPP identifies the needed or required network protocols for processing the network packet, and at 121 sends the network packet to the processing stack of the needed network protocol for processing. In due course, according to the scheduling and priority characteristics associated with the network protocol and the network packet, the network packet will be processed by the network protocol software at 122. Whereupon, depending upon the processing at 123, results associated with processing the network packet is sent to the original DPP or a different DPP that may be dictated by the processing of the network protocol software.

In some embodiments, the network packet is associated with storage access commands, storage statistics, storage control operations, storage management operations, and/or storage monitoring operations. Thus, the network packet can be in a SNMP format requiring a processor that is enabled with SNMP, but the SNMP protocol is not installed on the DPP. Thus, the DPP can still process this SNMP-formatted packet by wrapping the packet with a header that permits transmission to the CPP (e.g., in Ethernet or FC format). The CPP then strips this header, identifies the SNMP packet and sends the packet to a SNMP stack interface on the CPP. Of course as one of ordinary skill in the art readily recognizes, the needed protocol-enabled network interfaces can be any protocol-enabled network interface not installed or directly available to the DPP, such as, but not limited to, any VTP-enabled interfaces, Bluetooth interfaces, and others.

Moreover, in some embodiments, the DPP originally receives the network packet from any SCSI/iSCSI enabled device. The network packet can be received over GigE, FC, or other interfaces. Thus, it can be that the network packet is being received by the DPP from a device that has the necessary protocol-enabled network interface to originally construct the foreign network packet that is received by the DPP. The DPP, however, does not need to have the network protocol installed since the DPP effectively uses an encapsulated interface with the CPP to acquire the necessary processing for the network packet. Therefore, the foreign protocol-enabled network interface is virtually or logically available to the DPP through the CPP. Moreover, since the DPP and CPP communicate internally or locally with one another communication between the DPP and CPP is extremely fast and efficient. Thus, little degradation in performance will be experienced in the network's environment.

One of ordinary skill in the art now appreciates how a single encapsulated network interface between one or more DPPs and a CPP can be used to achieve processing associated with a variety of network protocols that are not installed or enabled on the DPPs. Accordingly, organizations can now upgrade a single or a small subset of CPPs within their network environments as new network protocols or software becomes desirable, without having to perform mass upgrades or installs on each of the available DPPs within their network environments. This creates a more manageable and supported networked environment with lower costs, reduces resource usage, and can be performed in a timelier manner. Any newly installed network protocol on a CPP will dynamically be accessible to the DPPs once installed, since the DPP does not need to know about the new network protocol and merely transfers any associated network packet to the CPP for processing on the DPP's behalf.

Figure 2:
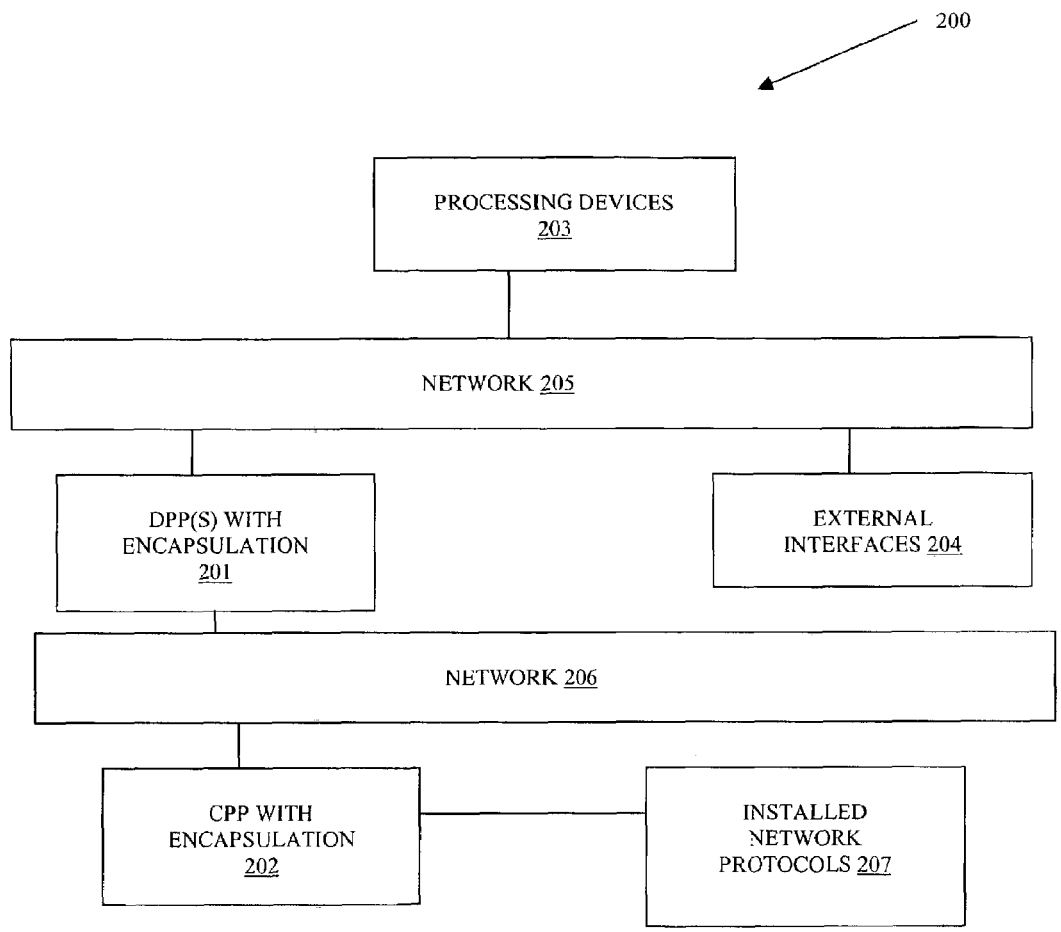
FIG. 2 is a block diagram of an encapsulated network interface system, according to one embodiment of the present invention.

FIG. 2 illustrates a block diagram of one encapsulated network interface system 200, according to one embodiment of the present invention. The encapsulated network interface system 200 includes one or more DPPs 201 and a CPP 202. Further, the encapsulated network interface system 200 is implemented in one or more network routers utilizing hardware, firmware, and/or software to carry out the embodiments of the present disclosure.

The DPPs 201 communicate via network 205 to one or more processing devices 203. The processing devices can include Network Attached Storage (NAS) appliances and/or devices, clients, servers, other routers, and/or other DPPs. The DPPs 201 also include one or more external interfaces 204 to other processing devices. Moreover, the DPPs 201 utilize a local or internal network connection 206 to the CPP 202. Network 206 is a local or internal connection that permits fast high speed transfer and communication between the DPPs 201 and the CPP 202. In some embodiments, the DPPs 201 and the CPP 202 reside within a single router with different slot connections having a backplane that permits the DPPs 201 and the CPP 202 to communicate and transfer data between one another rapidly. In other embodiments, one or more of the DPPs 201 reside within the same router as the CPP 202, while other DPPs 201 reside on separate routers from the CPP 202. In yet more embodiments, the DPPs 201 reside on a different router than the CPP 202.

Both the DPPs 201 and the CPP 202 include protocols/software for processing network packets and for communicating with one another. However, a number of network protocols 207 are installed and accessible to the CPP 202 and not directly installed on at least some of the DPPs 201. In these instances, where a DPP 201 lacks a network protocol needed for processing a received network packet, the network protocol and the data format (including packet header) will be unrecognized by the DPP 201 when received from a processing device 203 or an external interface 204 for processing.

Thus, when a DPP 201 determines that it has a network packet in a format that is not recognized, the DPP 201 adds an internal packet header to the network packet and forwards it over network 206 (or backplane) to the CPP 202. The CPP 202 strips the internal packet header added by the sending DPP 201, constructs, perhaps another header to attach to the network packet identifying the sending DPP 201, and sends the network packet to an appropriately installed network protocol's processing stack having the needed software instructions for subsequent processing or handling of the network packet.

Once the appropriate network protocol 207 processes the network packet the results are communicated back through the network 206 (or backplane) to the sending DPP 201 or to a different DPP 201 that is to receive the processing results. The results will be then forwarded to the appropriate external interface 204 or processing device 203 by the DPP 201 receiving the results. When the network protocol 207 processes the results the resulting packet or packets will be in a format that can be processed by the DPP 201, since the network protocol software 207 will have the necessary information received from the CPP 202 about the DPP 201 and can attached an appropriate header.

Thus, the DPP 201 need not have any knowledge associated with network protocols 207 and can still process network packets one behalf of processing devices 203 and/or external interfaces 204 by using an encapsulated interface to communicate with the CPP 202. The CPP 202 includes the necessary network protocols 207 to process the network packets on behalf of the DPP 201. Thus, operation and processing of the network packet seamlessly occurs within the networked environment on behalf of the processing devices 203 and/or external interfaces 204 when the DPPs 201 lack the actual installation of needed network protocols 207. Accordingly, network management, control, monitoring, and other commands can occur across a variety of processing devices using a plurality of network protocols 207, where the network protocols are centrally controlled and administered from the CPP 202 and not individually on each of the DPPs 201 within the networked environment.

Although FIG. 2 depicts a single CPP 202, it is readily apparent that this need not always be the case. Thus, for load balancing purposes or more efficient processing distribution sets of DPPs 201 can communicate with dedicated CPPs 202. In this case, network management, support, monitoring, and control is still substantially improved, since only a subset of instances of network protocols 207 need to be maintained within the storage environment, rather, than what has been conventionally required where each of the network protocols require management, support, monitoring, and control on each of the DPPs 201 within the networked environment.

Figure 3:
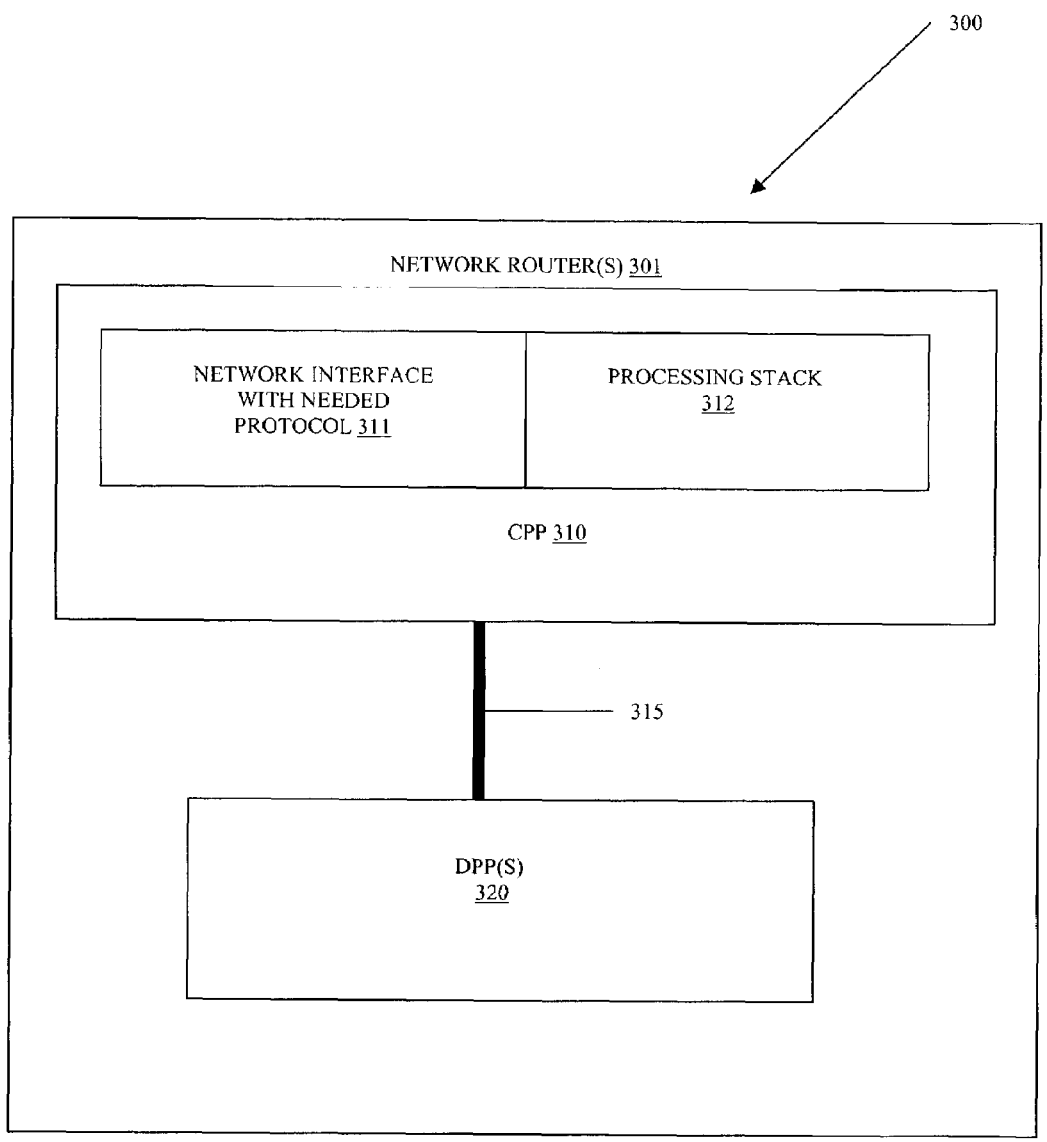
FIG. 3 is a block diagram of an encapsulated network interface accessible over routers in a networked environment, according to one embodiment of the present invention.

FIG. 3 illustrates a block diagram of one encapsulated network interface 300 accessible over network routers 301 in a networked environment, according to one embodiment of the present invention. The encapsulated network interface 300 is implemented in one or more network routers 301. In the instances where the encapsulated network interface 300 is implemented in a single router 301 communications between a CPP 310 and one or more DPPs 320 can occur over an internal or local network connection or a backplane 315. In other instances where the encapsulated network interface 300 is implemented across routers 301, the CPP 310 communicates with the DPPs 320 via a fast local Ethernet connection 315.

The encapsulated network interface 300 includes a network interface with needed protocols 311 having a processing stack 312. The network interface 311 includes software and/or protocols necessary to process network packets in data formats required by a specific network protocol. The network interface 311 also includes translation and conversion utilities to communicate its proprietary format in other data formats and protocols within the storage environment, such as TCP/IP and the like.

In some embodiments, the network interface 311 and processing stack 312 include protocol software supporting SNMP, VTP, Bluetooth, or any other protocols not installed and directly available to each of the DPPs 320. In some embodiments, a number of the DPPs 320 have some protocols installed, but not all of the DPPs 320 will have all of the protocols installed on their network interfaces 311. In these embodiments, it may be that legacy DPPs 320 utilizing the techniques of the present disclosure have been upgraded or loaded with some protocol support. Yet, the tenets of the present invention can still be used by DPPs 320 that are not yet compatible with a number of network protocols, and these incompatible network protocols can still be dynamically made available to each of the DPPs 320 through the CPP 310.

The processing stack 312 of the network protocol is used for prioritizing and scheduling the processing of network packets. The CPP 310 receives network packets from DPPs 320 that do not recognize the data format/protocol being used with the network packets. When this occurs, the CPP 310 sends the network packets to the processing stack 312 of the network protocol that is capable of processing the received network packets. The network protocol software processes the network packets and the resulting network packets are sent back to the original sending DPP 320 or any other required DPP 320 dictated by the resulting network packets. In some embodiments, the CPP 310 may directly send the resulting network packets along to the original sending processing device, client, server, or external interfaces without any further action by the original sending DPP 320. In other embodiments, the CPP 310 or the network protocol software attaches a header in a format that allows the DPP 320 to know where to send the resulting network packets.

Thus, the encapsulated network interface 300 permits a DPP 320 to encapsulate an unknown or foreign network packet, associated with a uninstalled network protocol and residing remote from the DPP 320, to be virtually or logically processed by the DPP 320 via the CPP 310 over connection 315. In one embodiment, this encapsulation is achieved by the DPP 320 recognizing that it does not in fact recognize a data format/protocol for a received network packet. In response to this event, the DPP 320 wraps or affixes a header to the network packet and forwards it along to the CPP 310 via connection 315. The CPP 310 identifies the encapsulated header from the DPP 320, strips it off, adds perhaps additional information to the network packet so that the network interface 311 knows which DPP 320 requested the processing, and submits the network packet to the processing stack having the needed protocol software support.

It is now apparent to one of ordinary skill in the art, how network management protocols can be distributed across a networked environment via an encapsulated network interface 300 that is utilized between a central processing CPP 310 and a plurality of DPPs 320. This improves network management of these network protocols by having them in a central and single location for maintenance, support, upgrades, and any additional desired network protocols. This also allows existing legacy network routers or DPPs 320 to obtain instant and dynamic access to new network protocols deployed in the networked environment once these new protocols are successfully installed and loaded on interfaces 311 of the CPP 310. The DPPs 320 only need the software capability to affix or wrap a header around unrecognized network packets and to forward the same to the CPP 310. This software installation is a one time event that can then be utilized with a plurality of additional protocols later used within a network without further modification to each the DPPs 320.

Figure 4:
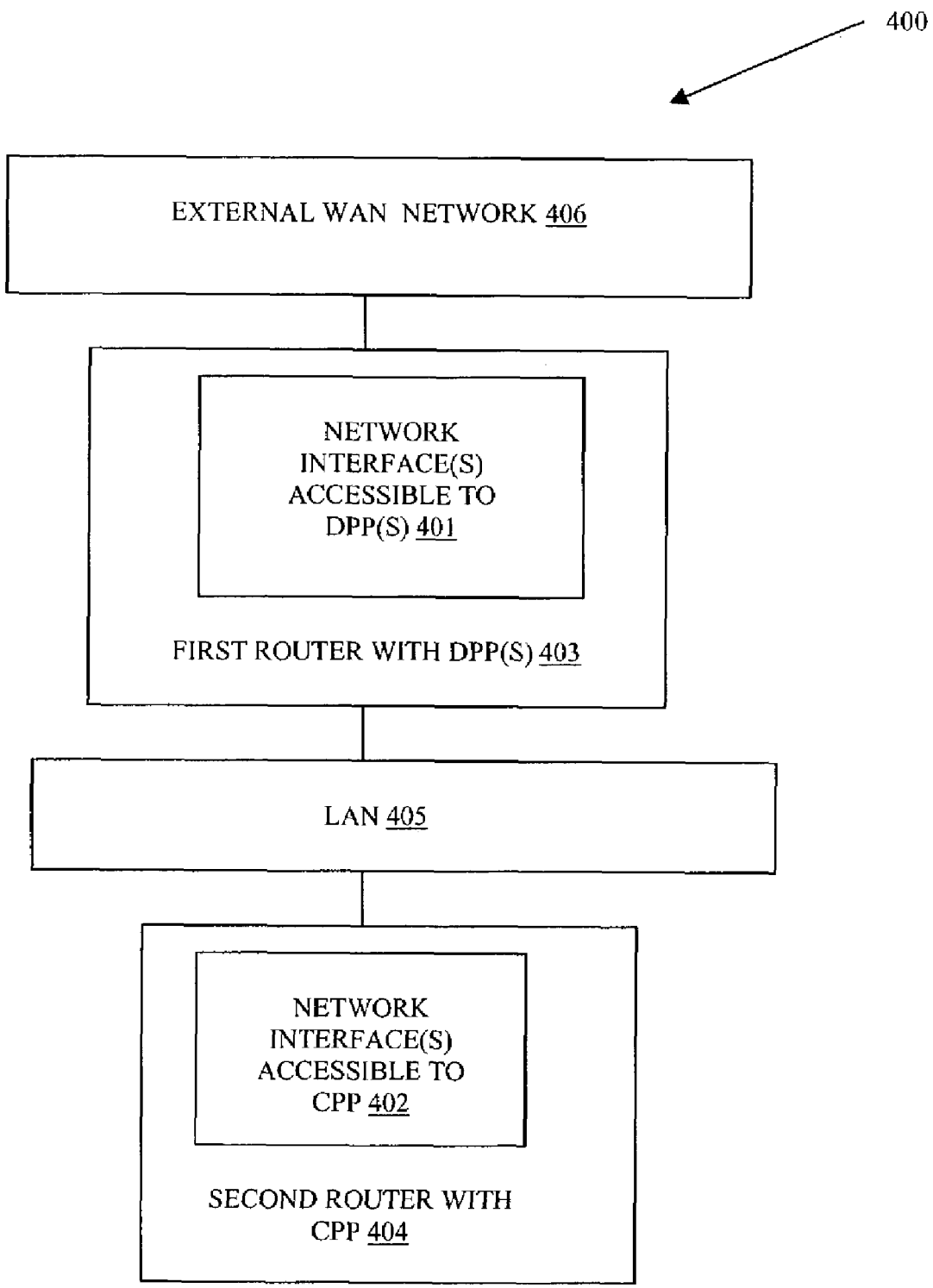
FIG. 4 is a block diagram of a network management system, according to one embodiment of the present invention.

FIG. 4 illustrates a block diagram of one network management system 400, according to one embodiment of the present invention. The network management system 400 includes one or more network interfaces with protocol support 401-402, a first router 403 and a second router 404. The network management system 400 is distributed in a networked environment, such as a SAN, LAN, or WAN environment. Moreover, the network management system 400 is implemented as a plurality of software and/or firmware distributed on the routers 403-404 within the networked environment.

A number of the network interfaces and protocols 401 are directly accessible or installed on the DPP 403, and a number of the network interfaces and protocols 402 are directly accessible or installed on the CPP 404. The DPP 403 is interfaced to a number of other processing devices or devices enabled to request access to other devices through external and/or WAN networks 406. Additionally, communication between the DPP 403 and the CPP 404 occurs over a local or internal network 405 (or backplane), which permits fast and efficient transfer of network packets between the DPP 403 and the CPP 404.

The DPP 403 receives a network packet from a device through network connection 406 and inspects the network packet header. When the DPP 403 determines that it does not recognize the data format/protocol of the packet header, indicating that the network packet is associated with a network interface and protocol software 402 accessible to the CPP 404, the DPP 403 adds a header to the network packet and forwards the network packet to the CPP 404 over LAN 405 (or backplane).

When the CPP 404 receives the network packet, it strips the added header attached by the DPP 403, and perhaps adds DPP 403 identifying information to the network packet, and then places the network packet in a processing stack associated with an appropriate network interface having the needed protocol software 402, which is installed on the CPP 404. The network interface having the installed protocol software 402 processes the network packet and sends the results as packets back to other software processing on the CPP 404, the original sending DPP 403, a different DPP 403 requiring the results, or to a processing device that originally provided the initial network packet.

In some embodiments, the DPP 403 and the CPP 404 are integrated as a single router box, and LAN 405 is a backplane or bus that permits the DPP 403 and the CPP 404 to communicate with one another. In other embodiments, the DPP 403 and the CPP 404 reside on different routers and communicate over and internal of fast LAN 405.

Furthermore, in some embodiments, the original network packet is associated with a network access request, a network control request, a network management request, and/or a network monitoring request. The request is associated with a network interface having protocol software 402 installed on the CPP 404 and not directly installed on the DPP 403. Thus, the DPP 403 uses the CPP 404 to distribute processing associated with the request to the CPP 404. Moreover, the DPP 403 does not need to know any of the particulars associated with the data format/protocol of the request, since the request is encapsulated and sent to the CPP 404 for processing. The CPP 404 has the network interface with the installed protocol software 402 that can process the request on behalf of the DPP 403.

It is now apparent to one of ordinary skill in the art, how a networked environment can include one or more network routers having multiple processors, where one of the processors has installed network protocols not installed on a number of the other processors and can perform seamless processing on unrecognized network packets on behalf of other processors. This permits easy integration of network protocols into a networked environment without requiring installation and maintenance of the network protocols on each of the processors in the networked environment.

CONCLUSION

The above-described methods, interfaces, and systems provide various embodiments to improve maintenance, support, processing, and installation of network protocols in a networked environment.

It is to be understood that the above description is intended to be illustrative, and not restrictive. Many other embodiments will be apparent to those of skill in the art upon reviewing the above description. The scope of the subject matter should, therefore, be determined with reference to the following claims, along with the full scope of equivalents to which such claims are entitled.

As shown herein, the present invention can be implemented in a number of different embodiments, including various methods, a circuit, an I/O device, a system, and an article comprising a machine-accessible medium having associated instructions.

Other embodiments will be readily apparent to those of ordinary skill in the art. The elements, algorithms, and sequence of operations can all be varied to suit particular requirements.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description of Exemplary Embodiments, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description of Exemplary Embodiments, with each claim standing on its own as a separate preferred embodiment.

The invention claimed is:

1. A method to encapsulate a network interface within a networked environment, comprising:

determining, by a data path processor, that a received network packet is associated with a non installed network protocol and that network packet is being communicated in an unrecognized protocol associated with the non installed network protocol by inspecting a received packet header associated with the received network packet and determining that the data path processor cannot process the received packet header and the received network packet because the received packet header is in an unrecognized data format that the data path processor does not recognize; and forwarding, by the data path processor, the network packet to a control path processor over a network for processing, and wherein the control path processor recognizes the unrecognized protocol of the received network packet on behalf of the data path processor and the control path processor processes the unrecognized protocol on behalf of the data path processor, and wherein the data path processor encapsulates the received network packet with another header that the data path processor does recognize and wherein the header identifies the data path processor to the control path processor, and wherein the non installed protocol is in a format associated with Gigabit Ethernet (GigE), Fibre-Channel (FC), Asynchronous Transfer Mode (ATM), Time Division Multiplexing (TDM), and Frame Relay (FR), and wherein results associated with the control path processor processing the unrecognized protocol are sent back to the data path processor for processing in a format recognized by the data path processor.

2. The method of claim 1 further comprising:

stripping, by the control path processor, the header; and placing, by the control path processor, the network packet in a processing stack associated with needed network protocol, which is installed on or accessible to the control path processor.

3. The method of claim 1 wherein in determining, the non installed network protocol is at least one of a Simple Network Management Protocol (SNMP), a Bluetooth interface, and a Virtual Truncation Protocol (VTP).

4. An encapsulated network interface system for network management, comprising:
   one or more data path processors;
   a control path processor; and
   wherein the one or more data path processors are in communication with one or more network devices, one or more external network interfaces, and to the control path processor, the one or more data path processors receive network packets from the one or more external network interfaces for access to one or more of the network devices, and when one of the network packets is associated with a non recognized network protocol in an unrecognized protocol format as identified by a packet header unknown to the data path processors, the data path processors do not recognize the packet header or the packet header's format and the associated network packets are encapsulated with another header that the identifies the data path processors and that can be processed by the data path processors and passed over a network to the control path processor for processing using a recognized network protocol accessible to the control path processor but not accessible to the one or more data path processors, and wherein the unrecognized network packet is processed on behalf of the data path processors by the control path processor, and wherein the unrecognized protocol format is in a format associated with Gigabit Ethernet (GigE), Fibre-Channel (FC), Asynchronous Transfer Mode (ATM), Time Delay Multiplexing (TDM), and Frame Relay (FR), results produced by the control path processor when processing the unrecognized network packet are sent back to the data path processors in a format that is recognized and processed by those data path processors.

5. The encapsulated network interface system of claim 4, wherein the system distributes processing associated with a router for a storage environment, and the network packets are associated with at least one of storage access, storage monitoring, storage controlling, and storage management.

6. The encapsulated network interface system of claim 4, wherein the one or more data path processors resides in one or more first router devices and the control path processor resides in a second router device.

7. The encapsulated network interface system of claim 6, wherein at least one of the data path processors resides in the second router device with the control path processor.

8. The encapsulated network interface system of claim 4, wherein any of the network packets associated with a non recognized network protocol is encapsulated by one or more of the data path processors in a transmission data format recognized by an inter-device protocol used for communicating between the data path processors and the control path processor.

9. The encapsulated network interface system of claim 8, wherein the control path processor de-encapsulates any of the encapsulated network packets and places the appropriate network packets in a recognized network protocol processing stack for processing.

10. An encapsulated network interface accessible over one or more routers, comprising:
   a network interface for processing network packets in a first data format associated with a network protocol;
   a processing stack for scheduling the processing of the network packets and prioritizing the network packets within the processing stack for the network protocol; and
   wherein a control path processor residing on a first router receives encapsulated network packets from one or more data path processors that reside on different routers connected or in communication over a network, and wherein the one or more data path processors do not recognize or understand the first data format associated with the network protocol and the data path processors to not recognize or understand the first data format that is all associated a first packet header associated with the network packets and the data path processors add another packet header that the data path processors recognize to the network packets and that identify the data path processors to the control path processor, and the control path processor de-encapsulates the encapsulated network packets and places the de-encapsulated network packets in the processing stack in the first data format for processing by the network protocol to process the network packets on behalf of the data path processors, and wherein the first data format is in a format associated with Gigabit Ethernet (GigE), Fibre-Channel (FC), Asynchronous Transfer Mode (ATM), Time Division Multiplexing (TDM), and Frame Relay (FR), results associated with the control path processor processing the network data packets are communicated back to the data path processors for processing once completed by the control path processor.

11. The encapsulated network interface of claim 10, wherein the network protocol is not installed on routers associated with the one or more data path processors.

12. A network management system, comprising:
   one or more network protocols supporting one or more first data formats;
   a first router having one or more data path processors; and
   a second router having a control path processor, wherein the second router includes a number of the network protocols not installed on the first router, and one or more of the data path processors utilizes the network protocols not installed on the first router by determining that a received network packet and that network packet's data header are is an unrecognized data format and unrecognized network protocol and includes a non recognized packet header and data path processors add a header on the received network packet that is recognized by the data path processors and that identifies the data path processors to the control path processor and then forwards the network packet to the control path processor via a network on the second router, where the control path processor strips the header added by the data path processors and places the network packet in a processing stack associated with one of the network protocols installed on the control path processor and which does recognize the unrecognized network protocol, and the unrecognized data format is in one of the one or more first data formats, and wherein the control path processor processes the network packet on behalf of the data path processors, and wherein the unrecognized network protocol is in a format associated with Gigabit Ethernet (GigE), Fibre-Channel (FC), Asynchronous Transfer Mode (ATM), Time Division Multiplexing (TDM), and Frame Relay (FR), results produced by the control path processor processing the network packet are communicated back to the data path processors in a format recognized by the data path processors for subsequent processing by the data path processors.

13. The network management system of claim 12, wherein additional data formats are installed on the second router and become dynamically available to the one or more data path processors on the first router via the control path processor once installed on the second router.

14. The network management system of claim 12, wherein the first router and the second router are located within a single integrated routing device.

15. The network management system of claim 12, wherein the first router communicates with a number of external network interfaces.

16. The network management system of claim 12, wherein a select number of the network protocols are installed on the one or more data path processors of the first router.

17. The network management system of claim 12, wherein communication between the first router and the second router occurs via an Ethernet interface.

* * * * *

UNITED STATES PATENT AND TRADEMARK OFFICE
CERTIFICATE OF CORRECTION

| | | |
|---|---|---|
| PATENT NO. | : 7,706,316 B1 | Page 1 of 1 |
| APPLICATION NO. | : 10/403235 | |
| DATED | : April 27, 2010 | |
| INVENTOR(S) | : Timothy J. Kuik | |

It is certified that error appears in the above-identified patent and that said Letters Patent is hereby corrected as shown below:

In column 11, line 28, in Claim 4, delete "Delay" and insert -- Division --, therefor.

In column 12, line 7, in Claim 10, delete "associated a" and insert -- associated with a --, therefor.

Signed and Sealed this

Eighth Day of June, 2010

David J. Kappos
*Director of the United States Patent and Trademark Office*